(12) United States Patent
Lammi et al.

(10) Patent No.: US 9,731,992 B2
(45) Date of Patent: Aug. 15, 2017

(54) METHOD FOR HEATING GLASS SHEET, AND GLASS TEMPERING FURNACE

(71) Applicant: TAIFIN GLASS MACHINERY OY, Tampere (FI)

(72) Inventors: Petri Juhani Lammi, Kyröskoski (FI); Esa Ensio Lammi, Tampere (FI); Jarno Tapio Nieminen, Kyröskoski (FI); Jukka Tapani Sääksi, Nokia (FI)

(73) Assignee: TAIFIN GLASS MACHINERY OY, Tampere (FI)

( * ) Notice: Subject to any disclaimer, the term of this patent is extended or adjusted under 35 U.S.C. 154(b) by 0 days.

(21) Appl. No.: 14/308,196

(22) Filed: Jun. 18, 2014

(65) Prior Publication Data

US 2015/0007613 A1 Jan. 8, 2015

(30) Foreign Application Priority Data

Jul. 3, 2013 (FI) ...................................... 20135728

(51) Int. Cl.
*C03B 27/012* (2006.01)
*C03B 27/04* (2006.01)
*C03B 27/044* (2006.01)
*C03B 29/08* (2006.01)

(52) U.S. Cl.
CPC .......... *C03B 27/012* (2013.01); *C03B 27/044* (2013.01); *C03B 27/0404* (2013.01); *C03B 29/08* (2013.01)

(58) Field of Classification Search
CPC ... C03B 27/0404; C03B 27/044; C03B 27/00; C03B 27/012

USPC ....................................................... 65/114, 355
See application file for complete search history.

(56) References Cited

U.S. PATENT DOCUMENTS

| | | | | |
|---|---|---|---|---|
| 4,505,671 A * | 3/1985 | McMaster | ............... | C03B 29/08 219/388 |
| 4,886,540 A | 12/1989 | Nitschke | | |
| 5,443,609 A * | 8/1995 | Lehto | .................... | C03B 23/033 65/104 |
| 5,647,882 A * | 7/1997 | Thiessen | ................ | C03B 25/08 34/635 |
| 2004/0232135 A1* | 11/2004 | Vehmas | ................ | C03B 27/044 219/400 |
| 2004/0237591 A1* | 12/2004 | Shetterly | ................ | C03B 29/08 65/111 |

(Continued)

FOREIGN PATENT DOCUMENTS

| | | |
|---|---|---|
| EP | 0058529 A1 | 8/1982 |
| EP | 1481950 A1 | 12/2004 |

(Continued)

OTHER PUBLICATIONS

Nov. 10, 2014 Extended European Search Report issued in Application No. 14174023.3.

(Continued)

*Primary Examiner* — Alison L Hindenlang
*Assistant Examiner* — Mohamed K Ahmed Ali
(74) *Attorney, Agent, or Firm* — Oliff PLC

(57) ABSTRACT

A glass tempering furnace and a method for heating a glass sheet. The glass sheet is heated in the glass tempering furnace by blowing heating air on the top surface of the glass sheet, and the blowing distance of the heating air from the top surface of the glass sheet is adjusted.

10 Claims, 3 Drawing Sheets

(56) References Cited

U.S. PATENT DOCUMENTS

2009/0100875 A1    4/2009  Engels et al.

FOREIGN PATENT DOCUMENTS

| EP | 1 659 100 A1 | 5/2006 |
| WO | WO 96/13465 A1 | 5/1996 |
| WO | 2008071833 A1 | 6/2008 |
| WO | WO 2009/122003 A1 | 10/2009 |

OTHER PUBLICATIONS

Nov. 25, 2016 Office Action issued in European Application No. 14174023.3.

* cited by examiner

METHOD FOR HEATING GLASS SHEET, AND GLASS TEMPERING FURNACE

BACKGROUND OF THE INVENTION

The invention relates to a method for heating glass sheets, and glass tempering furnace.

As glass sheets are heated in a glass tempering furnace, the aim is to heat them as evenly as possible. Any unevenness in the temperature of a glass sheet will result in tension in it and consequently optical errors in the glass. To establish as even as possible a temperature effect, the aim is to diversely adjust the temperature profile of the glass sheet.

BRIEF DESCRIPTION OF THE INVENTION

It is an object of the present invention to provide a new type of method for heating glass sheets and a new type of glass tempering furnace.

The solution of the invention is characterised by what is disclosed in the independent claims. Some embodiments of the invention are disclosed in the dependent claims.

In the solution put forth, a glass sheet is led into a glass tempering furnace, the glass sheet is heated in the glass tempering furnace by at least blowing heating air on the top surface of the glass sheet, and the blowing distance of the heating air from the top surface of the glass sheet is adjusted. By adjusting the blowing distance of the heating air, it is possible to influence the thermal effect that the heating air directs on the top surface of the glass sheet. The blowing distance may be adjusted either before the glass sheet is fed in the glass tempering furnace or when the glass sheet is already within the tempering furnace and the glass sheet is being heated by blowing heating air on the top surface of the glass sheet. Adjusting the blowing distance of the heating air together with adjusting the blowing force of the heating air, in use already previously, allow a more diverse heating of the glass sheet than before by the use of heating air in such a manner that the thermal effect according to the manufacturing formula of the glass sheet can be directed on the glass sheet. The adjustment of the heating air blowing distance together with the adjustment of the blowing force also make it easier to achieve the optimal energy-efficient working point of the tempering furnace, insofar as the use of heating air to heat a glass sheet is concerned.

BRIEF DESCRIPTION OF THE DRAWINGS

The invention is now described in closer detail in connection with preferred embodiments, with reference to the accompanying drawings, in which.

For the sake of clarity, the figures show some embodiments of the invention in a simplified manner. In the figures, like reference numerals identify like elements.

DETAILED DESCRIPTION OF THE INVENTION

Figure 1:
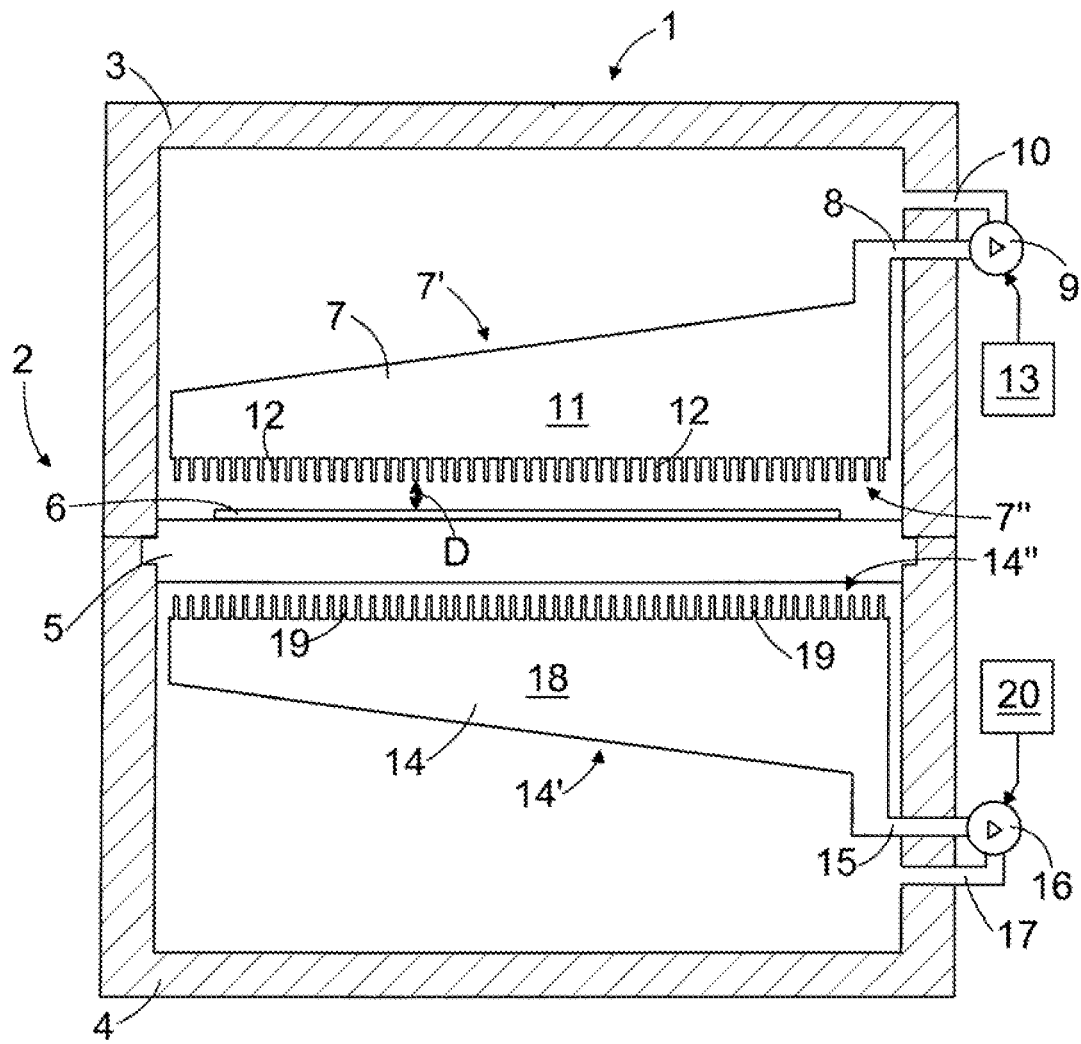
FIGS. 1 and 2 show a schematic sectional end view of a glass tempering furnace.
Figure 2:
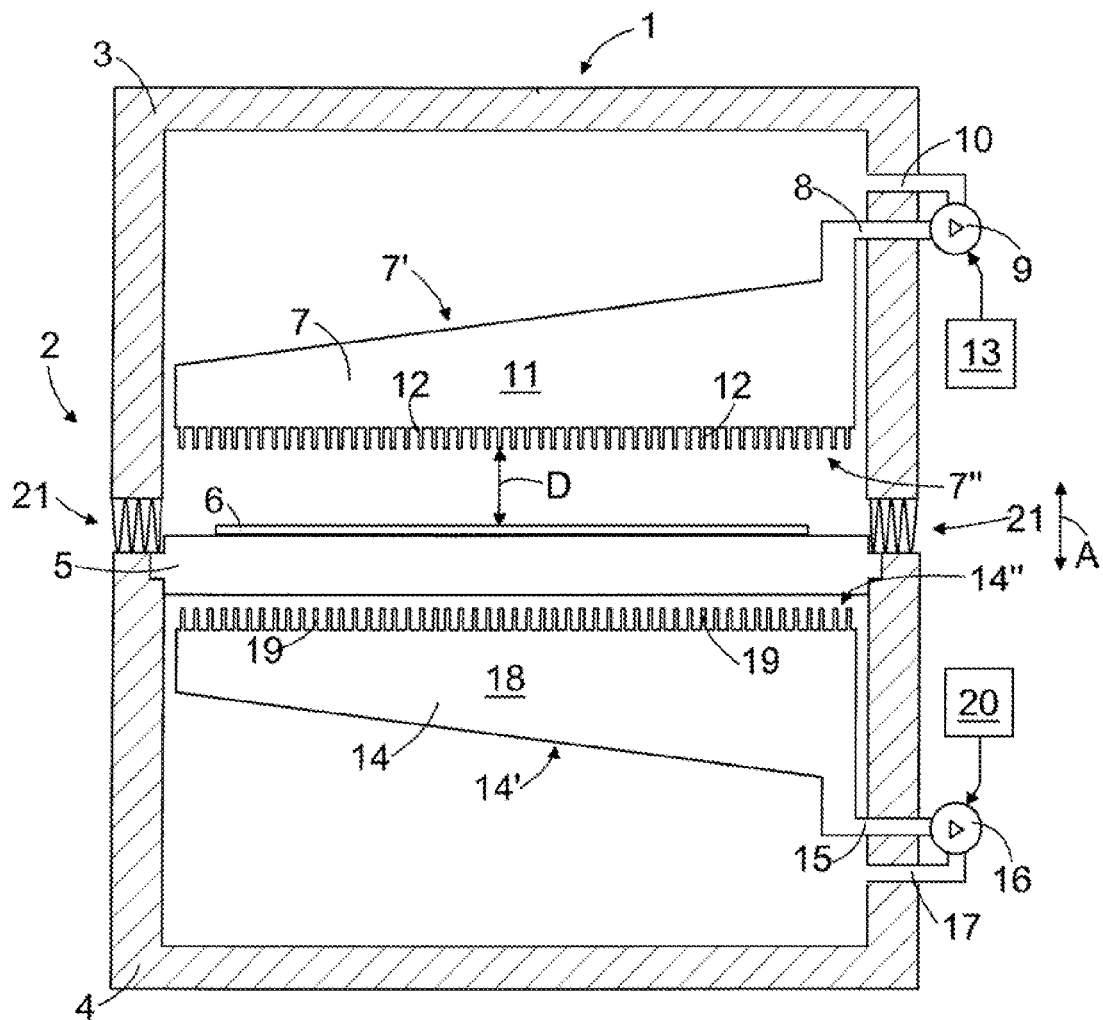

FIGS. 1 and 2 show a schematic cross-sectional end view of a glass tempering furnace 1. The tempering furnace 1 has a frame structure 2 which comprises a top part 3 and a bottom part 4, which are separate from one another in the sense that the top part 3 may be moved in the vertical direction of the tempering furnace 1 away from the bottom part 4 and towards it. FIG. 1 shows the tempering furnace 1 in an operating situation where the top part 3 of the tempering furnace 1 is in contact with the bottom part 4. FIG. 2, on the other hand, shows the tempering furnace 1 in an operating situation where the top part 3 of the tempering furnace 1 has been lifted up, whereby the top part 3 and the bottom part 4 of the tempering furnace 1, in the vertical direction of the tempering furnace 1, are separated from one another and there is a gap 21 between them. There are means in connection with the gap 21 to prevent the flowing of the blast air used for heating the glass sheet 6 out of the tempering furnace 1. The means in question will be examined in closer detail in connection with FIGS. 4, 5, and 6.

The tempering furnace 1 further has rolls 5, supported in connection with the frame structure 2, in FIGS. 1 and 2, in connection with the bottom part 4 of the frame structure 2. Typically, the rolls 5 are ceramic rolls 5, forming a conveyor of the tempering furnace 1, by which the glass sheets 6 are conveyed to the tempering furnace 1 and out of it. At the time the glass sheet 6 is being heated, the rolls 5 are typically driven in such a manner that the glass sheet 6 is oscillated back and forth in the tempering furnace 1 by the conveyor formed by the rolls 5. For reasons of clarity, the figures do not show means known per se for a person skilled in the art to rotate, drive or control the rolls 5. Instead of the conveyor formed by the rolls 5, the tempering furnace 1 may also make use of other conveying methods to carry the glass sheets 6.

The tempering furnace 1 further has blowing channels 7 of the top part 3, positioned in the space restricted by the top part 3, which are arranged to blow warm or hot air, that is, heating air, on the top surface of the glass sheet 6 in order to heat the glass sheet 6. Advantageously, there are several successive said blowing channels 7 in the direction of travel of the glass sheet 6, that is, in the longitudinal direction of the tempering furnace 1. For reasons of clarity, FIGS. 1 and 2 do not show the heating resistors 22, 23 or other means to be disclosed below in FIG. 3 that are possibly included in the tempering furnace 1 to warm or heat air, such means being placeable on the inside or outside of the tempering furnace 1 and being known per se for a person skilled in the art. The blowing channels 7 in the top part 3 are arranged substantially transverse in relation to the direction of travel of the glass sheets 6. In this context, the definition substantially transverse means in an embodiment that the blowing channels 7 in the top part 3 are at a 70-110 degree angle with respect to the direction of travel of the glass sheets 6. According to another embodiment, the blowing channels 7 in the top part 3 are at an 80-100 degree angle with respect to the direction of travel of the glass sheets 6. According to yet another embodiment, the blowing channels 7 in the top part 3 are at an 85-95 degree angle with respect to the direction of travel of the glass sheets 6.

The heating air is fed to the blowing channel 7 of the top part 3 through a feeding channel 8 of the top part 3. Each blowing channel 7 may comprise its own, separate feeding channel 8, or at least two blowing channels 7 may have a feeding channel 8 at least partly common. The tempering furnace 1 further has a blower 9 of the top part 3, used to feed air to the feeding channel 8. Each feeding channel 8 may be associated with its own, separate blower 9, or at least two feeding channels 8 may have a common blower 9. Air is fed back to the blower 9 from the top part 3 of the tempering furnace 1 through the return channel 10 in the top part 3, whereby the heating air of the glass sheet 6 may be circulated in the top part 3 of the tempering furnace 1 by the blower 9. At a top part 7' of the blowing channel 7 there is a blowing channel 7 feed part 11, which is wider at its forward end, that is, at the end of the feeding channel 8, and becoming narrower towards the end in the direction of the heating air flow. This way, heating air can be fed evenly along the entire length of the blowing channel 7. At a bottom part 7" of the blowing channel 7 there are nozzles 12 by means of which the flow may be directed on the top surface of the glass sheet 6. The nozzles 12 may be elongated tubular channels. With such elongated nozzles, the air flow can be effectively and precisely made to reach the desired place, even from a somewhat longer blowing distance. The blowing force of the heating air blown through the blowing channel 7 may be adjusted by a control unit 13, which is arranged to control the operation of the blower 9. Said control unit 13 may be an inverter, for example, by means of which the running speed of the blower, and hence the flow rate produced by the blower, are controlled.

The tempering furnace 1 further has blowing channels 14 of the bottom part 4, positioned in the space restricted by the bottom part 4, which are arranged to blow heating air on the bottom surface of the glass sheet 6 in order to heat the glass sheet 6. Advantageously, there are several successive said blowing channels 14 in the direction of travel of the glass sheet 6, that is, in the longitudinal direction of the tempering furnace 1. The blowing channels 14 in the bottom part 4 are arranged substantially transverse in relation to the direction of travel of the glass sheets 6. In this context, the definition substantially transverse means in an embodiment that the blowing channels 14 in the bottom part 4 are at a 70-110 degree angle with respect to the direction of travel of the glass sheets 6. According to another embodiment, the blowing channels 14 in the bottom part 4 are at an 80-100 degree angle with respect to the direction of travel of the glass sheets 6. According to yet another embodiment, the blowing channels 14 in the bottom part 4 are at an 85-95 degree angle with respect to the direction of travel of the glass sheets 6.

The heating air is fed to the blowing channel 14 of the bottom part 4 through the feeding channel 15 of the bottom part 4. Each blowing channel 14 may comprise its own, separate feeding channel 15, or at least two blowing channels 14 may have a feeding channel 15 at least partly common. The tempering furnace 1 further has a blower 16 of the bottom part 4, used to feed air to the feeding channel 15. Each feeding channel 15 may be associated with its own, separate blower 16, or at least two feeding channels 15 may have a common blower 16. Air is fed back to the blower 16 from the bottom part 4 of the tempering furnace 1 through the return channel 17 in the bottom part 4, whereby the heating air of the glass sheet 6 may be circulated in the top part 4 of the tempering furnace 1 by the blower 16. At a bottom part 14' of the blowing channel 14 there is a blowing channel 14 feed part 18, which is wider at its forward end, that is, at the end of the feeding channel 15, and becoming narrower towards the end in the direction of the heating air flow. This way, heating air can be fed evenly along the entire length of the blowing channel 14. At a top part 14" of the blowing channel 14 there are nozzles 19 by means of which the flow of the heating air may be directed on the bottom surface of the glass sheet 6. The nozzles 19 may be elongated tubular channels, either similar to or different from the ones in the blowing channels 7 of the top part 3. The blowing force of the heating air blown through the blowing channel 14 may be adjusted by a control unit 20, which is arranged to control the operation of the blower 16. The control units 13 and 20 may be one and the same physical device.

FIGS. 1 and 2 show a possible structure for a blowing channel 7, 14 used in the tempering furnace 1. The structure of the blowing channels 7, 14 of the tempering furnace 1 may also differ from the one presented in FIGS. 1 and 2. So, the nozzles 12, 19 of the blowing channel 7, 14, for example, may be replaced by, for example, a nozzle plate, such as a perforated plate, or a channel structure entirely open towards the top and/or bottom surface of the glass sheet 6. The tempering furnace 1 shown in FIGS. 1 and 2 may have, in its top part 3 in addition to the blowing channels 7, also other means for heating the glass sheet 6 from above. The bottom part 4 of the tempering furnace 1 may, either in addition to or instead of the blowing channels 14, have other means for heating the glass sheet 6 from below. The rolls 5 may also be used to heat the glass sheet 6 from below by, for example, arranging means in connection with the rolls 5 for heating the rolls 5.

The blowing channels 7 in the top part 3 of the tempering furnace 1 are fixedly supported to the structure of the top part 3 of the tempering furnace 1. In such a case, when the top part 3 of the tempering furnace 1 is being moved in the vertical direction in relation to the bottom part 4 of the tempering furnace 1 in the direction schematically shown by arrow A in FIG. 2 away from the bottom part 4 or towards it, the blowing channels 7 in the top part 3 move along with the top part 3 away from the bottom part 4, or towards it, whereby the distance of the blowing channels 7 in the top part 3 from the glass sheet 6, in other words, the blowing distance D of the heating air from the glass sheet 6, will change. In the operating position according to FIG. 1 of the tempering furnace 1, where the top part 3 is supported to the bottom part 4, the blowing distance D is at its minimum. The blowing distance D is at its maximum when the top part 3 is moved to the maximum distance from the bottom part 4, allowed by the adjustment range between the top part 3 and the bottom part 4. The top part 3 may be moved in relation to the bottom part 4 by, for example, a motor or another actuator and a power train mechanism arranged between the actuator and the tempering furnace 1.

So, when the position of the top part 3 of the tempering furnace 1 is changed in relation to the bottom part 4 in the vertical direction of the tempering furnace 1, the distance of between the blowing channels 7 in the top part 3 and the glass sheet 6 is changed at the same time, in other words, the blowing distance from the glass sheet 6 of the heating air directed on the glass sheet 6 is adjusted. By adjusting the blowing distance D of the heating air, it is possible to influence the thermal effect that the heating air directs on the top surface of the glass sheet 6. The position of the top part 3 of the tempering furnace 1 in relation to the bottom part 4 may be changed either before the glass sheet 6 is fed in the tempering furnace 1 or when the glass sheet 6 is within the tempering furnace 1. Adjusting the blowing distance D of the heating air together with the presented adjusting of the blowing force of the heating air allow a more diverse heating than before of the glass sheet 6 by heating air in such a manner that the thermal effect according to the manufacturing formula of the glass sheet 6 can be directed on it. The adjustment of the heating air blowing distance D together with the adjustment of the blowing force also make it easier to achieve the optimal energy-efficient working point of the tempering furnace 1, insofar as the use of heating air to heat the glass sheet 6 is concerned.

The distance of the blowing channels 7 in the top part 3 of the tempering furnace 1 from the glass sheet 6 may also be adjusted by arranging the blowing channels 7 in connection with the top part 3 of the tempering furnace 1 in a movable manner so that the position of the blowing channels 7 in the vertical direction of the tempering furnace 1 in its top part 3 may be changed without moving the top part 3 of the tempering furnace 1 in relation to the bottom part 4. In such a case, the thermal effect, directed by the heating air blown towards the glass sheet 6 through the blowing channels 7, on the glass sheet 6 may be adjusted by changing the distance of the blowing channels 7 to the glass sheet 6 without the top part 3 of the tempering furnace 1 being moved in relation to the bottom part 4. This also makes it possible to individually change the distance of the blowing channels 7, which are placed successively in the longitudinal direction of the tempering furnace 1, from the glass sheet 6, whereby the successive blowing channels 7 in the longitudinal direction of the tempering furnace 1 may also be set, if so desired, at different distances from the glass sheet 6.

Also such an embodiment is possible where both the position of the blowing channels 7 in the top part 3 of the tempering furnace 1 and the position of the top part 3 of the tempering furnace 1 in relation to the bottom part 4 may be changed.

Figure 3:
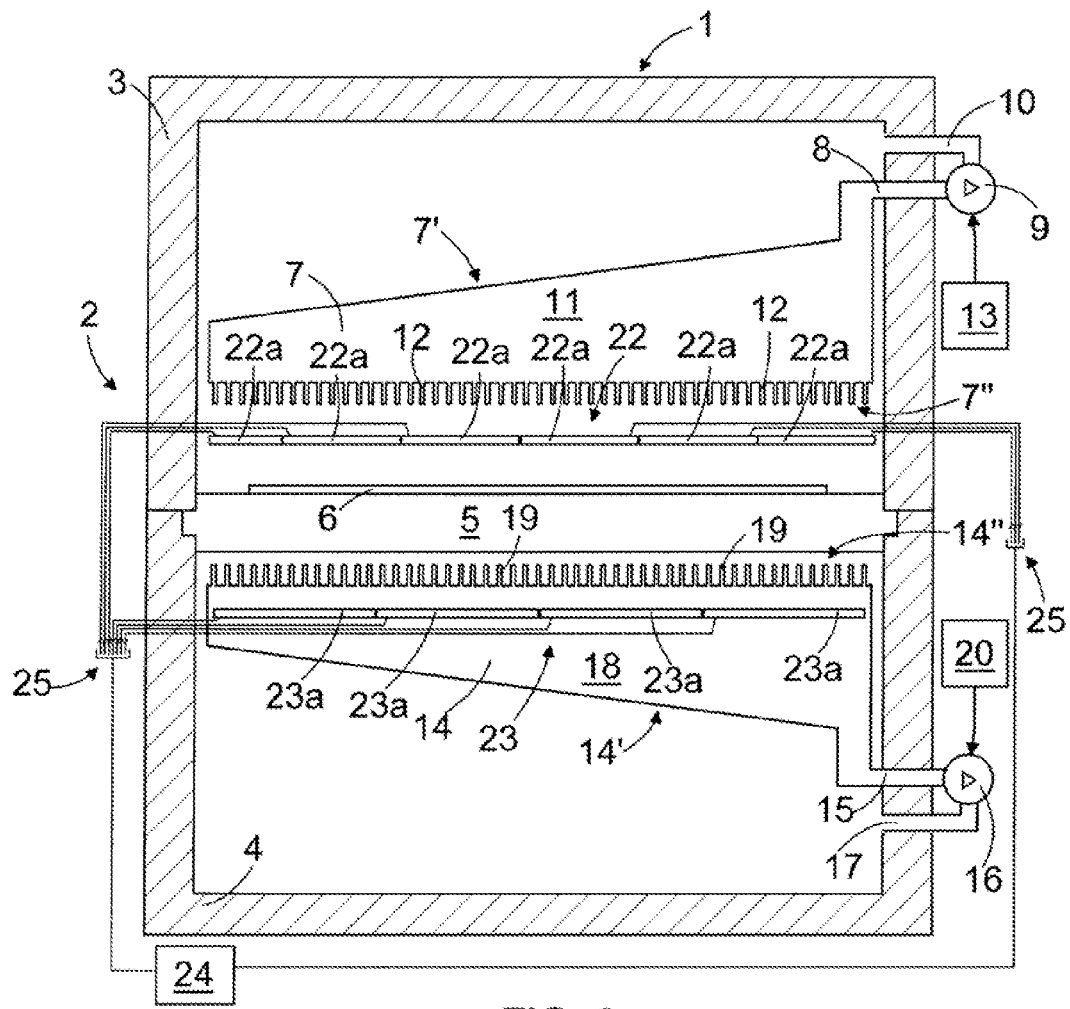
FIG. 3 is a schematic sectional end view of a second glass tempering furnace.

FIG. 3 is a schematic cross-sectional end-view representation of a second glass tempering furnace 1. The basic structure of the tempering furnace 1 shown in FIG. 3 is similar to what is shown in FIGS. 1 and 2, that is, the tempering furnace 1 has a frame structure 2 which comprises a top part 3 and a bottom part 4, which may be separated from one another, so the top part 3 of the tempering furnace 1 may be moved in relation to the bottom part 4 in the vertical direction of the tempering furnace 1, as schematically shown by arrow A in FIG. 2. FIG. 3 shows the tempering furnace 1 in an operating situation where the top part 3 of the tempering furnace 1 is in contact with the bottom part 4. The tempering furnace 1 shown in FIG. 3 additionally has blowing channels 7 in the top part to blow heating air on the top surface of the glass sheet 6, and blowing channels 14 in the bottom part 4 to blow heating air to the bottom surface of the glass sheet 6.

The top part 3 of the tempering furnace 1 further has several heating resistors 22 placed one after the other in the direction of travel of the glass sheet 6. The bottom part 4 of the tempering furnace 1, too, has several heating resistors 23 placed one after the other in the direction of travel of the glass sheet 6. Just like the blowing channels 7, 14, also the heating resistors 22, 23 are arranged substantially transverse in relation to the direction of travel of the glass sheets 6. In this case, too, the definition substantially transverse in relation to the direction of travel of the glass sheets 6 means that in an embodiment the heating resistors 22, 23 are at a 70-110 degree angle with respect to the direction of travel of the glass sheets 6. According to another embodiment, the heating resistors 22, 23 are at an 80-100 degree angle with respect to the direction of travel of the glass sheets 6. According to another embodiment, the heating resistors 22, 23 are at an 85-95 degree angle with respect to the direction of travel of the glass sheets 6.

In the embodiment shown in FIG. 3, the heating resistors 22 in the top part 3 of the tempering furnace 1 are placed, in the vertical direction of the tempering furnace 1, below the blowing channels 7, between the glass sheet 6 and the blowing channels 7, when the blowing channels 7 are in the closest possible position in relation to the glass sheet 6. The blowing channels 7 and the heating resistors 22 may be overlapping or they may be aligned in the direction of travel of the glass sheets 6. Deviating from the embodiment of FIG. 3, if the blowing channels 7 and the heating resistors 22 are aligned in the direction of travel of the glass sheets 6, the blowing channels 7 may be placed, in the vertical direction of the tempering furnace 1, at such a distance in relation to the glass sheet 6 that the heating resistors 22 are sited inside the blowing channels 7 when the blowing channels 7 are at the minimum distance from the glass sheet 6, as defined by the adjustment range of the distance adjustment between the blowing channels 7 and the glass sheet 6. The heating resistors 22 may be placed inside the blowing channels 7 also in such a way that the heating resistors 22 are supported to the blowing channels 7 so that they will stay within the blowing channels 7 in the entire adjustment range of the distance adjustment between the blowing channels 7 and the glass sheet 6.

In the embodiment shown in FIG. 3, the heating resistors 23 in the bottom part 4 of the tempering furnace 1 are placed, in the vertical direction of the tempering furnace 1, below the rolls 5. The blowing channels 14 and the heating resistors 23 may be overlapping or they may be aligned in the direction of travel of the glass sheets 6. The embodiment of FIG. 3 assumes that the blowing channels 14 and the heating resistors 23 are aligned in the direction of travel of the glass sheets 6, whereby the heating resistors 23 are placed inside the blowing channels 14.

If the heating resistors 22, 23 are arranged outside the blowing channels further from the glass sheet 6 to be heated than the blowing channels 7, 14, an adequately wide gap needs to be left between successive blowing channels 7, 14 in the longitudinal direction of the tempering furnace 1 so that the radiation from the resistors could efficiently heat the glass sheets.

The heating resistors 22 in the top part 3 of the tempering furnace 1 may be used to directly heat the glass sheet 6 from above. The heating resistors 23 in the bottom part 4 of the tempering furnace 1 may be also used to directly heat the glass sheet 6 from below. In addition to or instead of this, the heating resistors 22, 23 may also be used to heat the heating air blown from the blowing channel 7, 14. The heating resistors 22, 23 are used to heat the heating air blown from the blowing channel 7, 14 in particular in case the heating resistors 22, 23 are placed inside the blowing channels 7, 14. The heating resistors 22, 23 may be used for both direct heating of the glass sheet 6 and for heating the heating air blown from the blowing channels 7, 14 when the heating resistors 22, 23 are placed in alignment with the blowing channels 7, 14 in the direction of travel of the glass sheet 6, between the blowing channels 7, 14 and the glass sheet 6.

The use of the heating resistors 22 together with blowing heating air from the blowing channels 7 accomplishes, together with the blowing force and blowing distance of the heating air, a third dimension to adjusting the heating of the glass sheet 6 in the top part 3 of the tempering furnace 1, whereby the blowing force and blowing distance of the heating air used to heat the glass sheets 6 as well as the power of the heating resistors 22 may be simultaneously adjusted in order to achieve the optimal working point of the tempering furnace 1 when the glass sheet 6 according to the manufacturing formula is manufactured.

In the embodiment of FIG. 3, each heating resistor 22, 23 comprises a plurality of independently-controllable parts 22a, 23a, whereby the heating resistors are heating element rows consisting of successive parts 22a, 23a. The independently-controllable parts 22a, 23a of the heating resistors 22, 23 may be single elongated resistors, whereby there are several successive elongated resistors in a row in the heating resistor row. Each part 22a, 23a of FIG. 3 is shown as one, elongated piece for reasons of clarity, but a single part 22a, 23a, however, typically consists of several adjacent and separate resistor rods, whereby air can flow between them, at the same time effectively heating the air.

When the heating resistors 22, 23 consists of several, successive independently-controllable parts 22a, 23a, it is easier to manage the transverse temperature profile of the glass sheet 6, whereby the transverse temperature profiling of the glass sheet 6 can be carried out in a precise and managed way. So, by separately adjusting the independently-controllable parts 22a and 23a in the heating resistors 22 and 23, the temperature profile of the glass sheet 6 may easily and effectively be adjusted in the transverse direction in relation to its direction of travel. In particular when the heating resistors 22 and 23 are arranged in the blowing channels 7 and 14 they can be effectively used to adjust the temperature of the air blown onto the glass sheet 6. Further, when the blowing channels 7, 14 are substantially transverse in relation to the direction of travel of the glass sheets, there will be no longitudinal discontinuity spots forming on the glass sheet in its direction of travel, but the temperature can be kept even in the transverse direction.

FIG. 3 also schematically shows a control unit 24. The control unit 24 is used to adjust the independently-adjustable parts 22a and 23a of the heating resistors 22, 23, which is illustrated by the reference mark 25. The control unit 24 may be the same physical device as the control unit 13, 20. Depending on the embodiment of the tempering furnace 1, each control unit may also control other devices of the tempering furnace 1, such as the conveyor, or the moving of the top part 3 in relation to the bottom part 4. For reasons of clarity, the supports, cabling, and similar items of the heating resistors 22, 23 or their parts 22a, 23a are not shown in FIG. 3.

In the longitudinal direction of the glass sheets 6, in other words in their direction of travel, the temperature profile of the glass sheets 6 may be adjusted by adjusting the blowing force and/or the blowing distance D of the successive blowing channels 7, 14 in the longitudinal direction of the tempering furnace 1. The blowing force may be adjusted, for example, by independently adjusting blowers 9, 16 that are arranged one after the other in the longitudinal direction of the tempering furnace 1, making it possible to adjust the longitudinal profile of the temperature, as regards the blowing force, at as many places as there are independently-controllable blowers 9, 16 in the tempering furnace.

The temperature profile of the glass sheet 6 in its longitudinal direction may also be adjusted, in addition to or instead of what was disclosed in the previous paragraph, by adjusting the power of the heating resistors 22, 23, or their parts 22a, 23a, placed one after the other in the longitudinal direction of the tempering furnace 1.

The blowing channels 7, 14 can also be divided into at least two parts in the transverse direction in relation to the direction of travel of the glass sheet 6, whereby the transverse temperature profile of the glass sheet 6 may also be adjusted by adjusting the blowing force, if the tempering furnace 1 is provided with separate blowers associated with said parts or with flow control valves that control the flow of the heating air to the corresponding parts in the blowing channel 7, 14.

In connection with FIG. 3, it is set forth that the transverse profile of the glass sheet temperature may be adjusted both from above and below the glass sheet. If desired, the transverse profile of the glass sheet temperature may be adjusted only from below or above. If the transverse profile of the glass sheet temperature is only adjusted from above the glass sheet, for example, the heating means under the glass sheet may be formed simpler than what is described in FIG. 3. In such a case, the heating resistors 23 in the bottom part 4 do not necessarily need independently-controllable parts 23a, for example, but the heating resistor 23 may be substantially of the length of the transverse direction of the tempering furnace 1.

In the above example, the blowing channels and heating resistors or heating resistor rows are arranged substantially transverse in relation to the direction of travel of the glass sheet. However, within the scope of the solution put forth, also such embodiments of the tempering furnace 1 are possible where the blowing channels and/or heating resistors and/or heating resistor rows are arranged substantially parallel to the direction of travel of the glass sheet.

Figures 4, 5, 6:
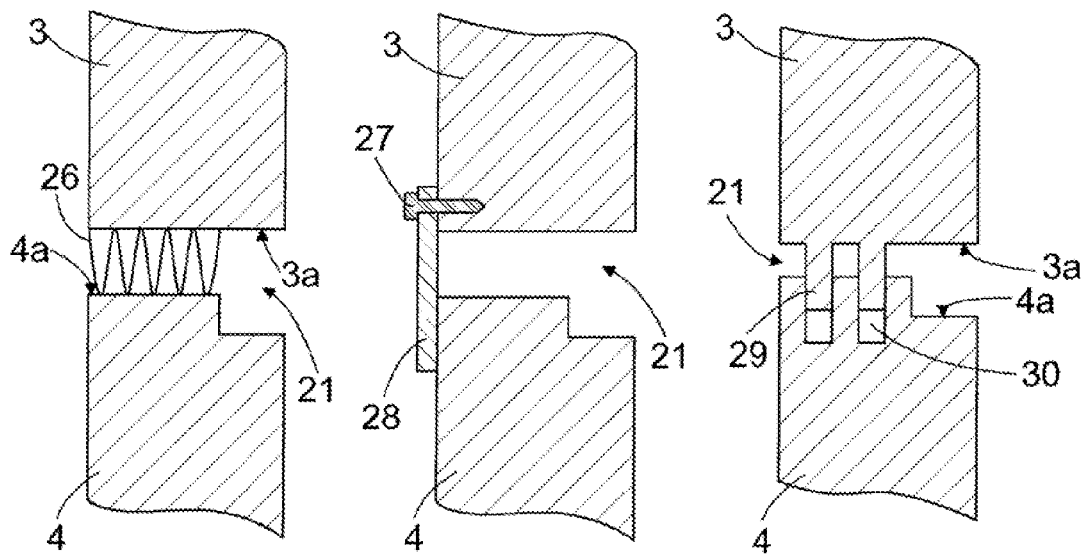
FIGS. 4, 5, and 6 show a schematic cross-sectional detail of a glass tempering furnace as seen from an end of the glass tempering furnace.

FIGS. 4, 5, and 6 show schematically a cross sectional detail of the tempering furnace 1, to be more precise, the interface between the top part 3 and bottom part 4 of the frame structure 2 in the tempering furnace 1. Each of the FIGS. 4, 5, and 6 present a possible embodiment for said interface, as seen in FIGS. 1-3 on the side of the left wall structure of the tempering furnace 1, whereby the left side of the wall structure shown in each of the FIGS. 4, 5, and 6 represents the outside of the tempering furnace 1 and the right side represents the inside of the tempering furnace 1. The purpose of the embodiment of each Figure is to seal the gap 21 that forms between the top part 3 and bottom part 4 of the frame structure 2 of the tempering furnace 1 when the top part 3 of the tempering furnace 1 is moved upward in relation to the bottom part 4.

In the embodiment according to FIG. 4, a flexible sealing element 26 is arranged in the tempering furnace 1 between a top part 3 surface 3a aimed at the bottom part 4, and a bottom part 4 surface 4a aimed at the top part 3, the sealing element being fixed to said surfaces 3a, 4a. The sealing element 26 is arranged to extend on the side walls of the tempering furnace 1 over the entire length of the tempering furnace 1 and also to the ends of the tempering furnace 1 to the extent that the sealing element 26 does not prevent the passage of the glass sheet 6 into the tempering furnace 1 and out of it. The flexible sealing element 26 allows the moving of the top part 3 in the vertical direction of the tempering furnace 1 in relation to the bottom part 4 without the gap 21, which forms between the top part 3 and the bottom part 4, opening to the outside of the tempering furnace 1, the sealing element 26 thus preventing the escape of the heating air out of the tempering furnace 1 through said gap 21. The sealing element 26 may be of any insulating material that has adequate heat endurance.

In the embodiment of FIG. 5, a platelike sealing element 28 is fixed to the outer surface of the wall structure in the top part 3 of the tempering furnace 1 with fasteners 27, such as screws, and arranged to be aimed down towards the bottom part 4 of the tempering furnace 1 and to extend from the top part 3 down at a distance along the wall structure of the bottom part 4 so that as the top part 3 moves up away from the bottom part 4, said sealing element 28 is arranged to slide along the outer surface of the wall structure of the bottom part 4, whereby the sealing element 28 closes the gap 21 forming between the top part 3 and bottom part 4. The dimensions of the sealing element 28 in the vertical direction of the tempering furnace 1 are designed so that the sealing element 28 covers the gap 21 forming between the top part 3 and the bottom part 4 also in the operating situation of the tempering furnace 1 where the distance between the top part 3 and bottom part 4 is at its maximum, in other words, at the maximum distance allowed by the adjustment range between the top part 3 and bottom part 4. The sealing element 28 is arranged to extend on the side walls of the tempering furnace 1 over the entire length of the tempering furnace 1 and also to the ends of the tempering furnace 1 to the extent that the sealing element 28 does not prevent the passage of the glass sheet 6 into the tempering furnace 1 and out of it. Similar sealing may be accomplished, for example, by a flap-like sealing element fixed in connection with the top part 3.

In the embodiment according to FIG. 6, the surface 3a in the top part 3, aimed at the bottom part 4, has protrusions 29 aimed at the bottom part 4, and the surface 4a in the bottom part 4, aimed at the top part 3, has recesses 30 corresponding to said protrusions 29, said protrusions 29 being placed in said recesses 30 and being able to move in said recesses 30 in the vertical direction of the tempering furnace 1 as the top part 3 of the tempering furnace 1 is moving in relation to the bottom part 4. There may be one or more of said protrusions 29 and recesses 30 in each wall structure, the quantity of the protrusions 29 and recesses 30 being two in the embodiment of FIG. 6. The protrusions 29 and recesses 30 are arranged to extend on the side walls of the tempering furnace 1 over the entire length of the tempering furnace 1 and also at the ends of the tempering furnace 1 to the extent that the passage of the glass sheet 6 into the tempering furnace 1 and out of it is not prevented. In the embodiment of FIG. 6, the protrusions 29 in the top part 3 and the recesses 30 in the bottom part 4 form matching sealing elements which close the gap 21 forming between the top part 3 and the bottom part 4, and prevent the heating air from escaping from the tempering furnace 1 through said gap 21. The protrusions 29 and the recesses 30 in the vertical direction of the tempering furnace 1 are designed so that they cover the gap 21 forming between the top part 3 and the bottom part 4 also in the operating situation of the tempering furnace 1 where the distance between the surface 3a in the top part 3, aimed at the bottom part 4, and the surface 4a in the bottom part 4, aimed at the top part 3, is at its maximum. The embodiment according to FIG. 6 may also be implemented by arranging the protrusions 29 on the surface 4a in the bottom part 4, aimed at the top part 3, and by arranging the recesses 30 on the surface 3a in the top part 3, aimed at the bottom part 4.

It is obvious for a person skilled in the art that as the technology advances the basic idea of the invention may be implemented in various ways. The invention and its embodiments are thus not restricted to the above-described examples but may vary within the scope of the claims.

The invention claimed is:

1. A method for heating a glass sheet in a glass tempering furnace having a frame structure comprising a top part and a bottom part which may be moved in relation to each other in the vertical direction of the glass tempering furnace, at least one sealing element adapted for sealing a gap that is formed between the top part and the bottom part when the top part is moved upward in relation to the bottom part, and at least one blowing channel arranged in its top part, the method comprising
feeding the glass sheet to the glass tempering furnace, and
heating the glass sheet in the glass tempering furnace by at least blowing heating air on the top surface of the glass sheet through said at least one blowing channel, wherein
the blowing distance of the heating air from the top surface of the glass sheet is adjusted by changing the distance of the blowing channel from the top surface of the glass sheet, said distance being changed by changing the position of the top part of the glass tempering furnace in relation to its bottom part in the vertical direction of the glass tempering furnace.

2. A method as claimed in claim 1, wherein the glass sheet is further heated in the glass tempering furnace by blowing heating air on the bottom surface of the glass sheet through at least one blowing channel arranged in the bottom part of the glass tempering furnace.

3. A method as claimed in claim 1, wherein heating air is blown on the top surface and/or bottom surface of the glass sheet in a substantially transverse direction in relation to the direction of travel of the glass sheet in the glass tempering furnace.

4. A method as claimed in claim 1, wherein the blowing force of the heating air is adjusted.

5. A method as claimed in claim 1, wherein the glass sheet and/or the heating air blown on the glass sheet is further heated by at least one heating resistor arranged in the top part and/or the bottom part of the glass tempering furnace.

6. A method as claimed in claim 5, wherein the heating resistor is arranged substantially transverse in relation to the direction of travel of the glass sheet in the glass tempering furnace.

7. A method as claimed in claim 5, wherein the heating resistor comprises a plurality of heating resistor parts placed one after the other, and the heating of the glass sheet and/or the heating of the heating air blown on the glass sheet is adjusted by the heating resistor by separately controlling the different heating resistor parts of the heating resistor.

8. A method as claimed in claim 1, wherein said sealing element is a flexible sealing element arranged between a top part surface aimed at the bottom part, and a bottom part surface aimed at the top part, the sealing element being fixed to said top part and bottom part surfaces.

9. A method as claimed in claim 1, wherein said sealing element is a platelike sealing element fixed to an outer surface of a wall structure in the top part with fasteners, and arranged to be aimed down towards the bottom part and to extend from the top part down at a distance along a wall structure of the bottom part so that as the top part moves up away from the bottom part, said sealing element is arranged to slide along the outer surface of the wall structure of the bottom part, whereby the sealing element closes the gap forming between the top part and the bottom part.

10. A method as claimed in claim 1, wherein said sealing element is one or more protrusions in a top part surface, the protrusions and the top part surface aimed at the bottom part, and one or more recesses in a bottom part surface, the bottom part surface aimed at the top part, said recesses corresponding to said protrusions, said protrusions being placed in said recesses and being able to move in said recesses in the vertical direction as the top part is moving in relation to the bottom part, the protrusions and recesses being arranged to extend on side walls of the tempering furnace over the entire length of the tempering furnace and at the ends of the tempering furnace to the extent that the passage of a glass sheet into the tempering furnace and out of it is not prevented.

* * * * *